United States Patent
Cudworth et al.

(10) Patent No.: US 11,720,744 B2
(45) Date of Patent: *Aug. 8, 2023

(54) INPUTTING IMAGES TO ELECTRONIC DEVICES

(71) Applicant: Microsoft Technology Licensing, LLC, Redmond, WA (US)

(72) Inventors: Adam John Cudworth, London (GB); Anna Maria Alfut, London (GB); Piotr Jerzy Holc, London (GB); Thomas Christopher Dixon, London (GB); Naomi Bianca Morton, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,568

(22) Filed: Oct. 31, 2022

(65) Prior Publication Data

US 2023/0049258 A1 Feb. 16, 2023

Related U.S. Application Data

(63) Continuation of application No. 15/183,226, filed on Jun. 15, 2016, now Pat. No. 11,494,547.

(51) Int. Cl.
*G06F 40/166* (2020.01)
*G06F 3/023* (2006.01)
(Continued)

(52) U.S. Cl.
CPC .......... *G06F 40/166* (2020.01); *G06F 3/0236* (2013.01); *G06F 3/0237* (2013.01);
(Continued)

(58) Field of Classification Search
CPC .... G06F 40/166; G06F 40/274; G06F 3/0236; G06F 3/0237; G06F 3/0482; G06F 3/04847; G06T 11/60; G06T 2200/24
See application file for complete search history.

(56) References Cited

U.S. PATENT DOCUMENTS 8,909,513 B2 * 12/2014 Leydon ................... G06F 40/20
704/5
9,043,196 B1 * 5/2015 Leydon ................. G06F 40/289
704/4
(Continued)

FOREIGN PATENT DOCUMENTS

CA 2782841 A1 4/2013
CN 101501610 A 8/2009
(Continued)

OTHER PUBLICATIONS

Paul Horowitz, Convert Text to Emoji Automatically in MAC OS X, Mar. 12, 2012, OSXDaily, pp. 1-5 (Year: 2012).*
(Continued)

*Primary Examiner* — Justin S Lee
(74) *Attorney, Agent, or Firm* — Schwegman Lundberg & Woessner, P.A.

(57) ABSTRACT

A computing device is described which has a memory storing text input by a user. The computing device has a processor which is configured to send the text to a prediction engine having been trained to predict images from text. The processor is configured to receive from the prediction engine, in response to the sent text, a plurality of predictions, each prediction comprising an image predicted as being relevant to the text. The processor is configured to insert a plurality of the images into the text on the basis of criteria comprising one or more of: ranks of the predictions, categories of the images, rules associated with one or more of the images, user input, a trigger word. The processor is
(Continued)

configured to insert the plurality of images into the text sequentially, in an order corresponding to ranks of the predictions.

18 Claims, 13 Drawing Sheets

(51) Int. Cl.
*G06F 40/274* (2020.01)
*G06F 3/0482* (2013.01)
*G06F 3/04847* (2022.01)
*G06T 11/60* (2006.01)

(52) U.S. Cl.
CPC ........ *G06F 3/0482* (2013.01); *G06F 3/04847* (2013.01); *G06F 40/274* (2020.01); *G06T 11/60* (2013.01); *G06T 2200/24* (2013.01)

(56) References Cited

U.S. PATENT DOCUMENTS

| | | | |
|---|---|---|---|
| 10,168,859 B2* | 1/2019 | Kozloski | G06F 40/30 |
| 10,203,843 B2* | 2/2019 | Tobens, III | G06F 3/04845 |
| 10,222,957 B2* | 3/2019 | Choi | G06F 40/274 |
| 10,305,828 B2* | 5/2019 | Cao | G06F 3/04886 |
| 10,685,186 B2* | 6/2020 | Gu | G06F 40/247 |
| 10,769,607 B2* | 9/2020 | Hewitt | G06F 3/04886 |
| 11,494,547 B2 | 11/2022 | Cudworth et al. | |
| 2004/0156562 A1* | 8/2004 | Mulvey | G06F 3/0237 |
| | | | 704/E15.019 |
| 2008/0244446 A1* | 10/2008 | LeFevre | G06F 3/0236 |
| | | | 715/810 |
| 2010/0131447 A1* | 5/2010 | Creutz | G06F 3/0237 |
| | | | 706/52 |
| 2015/0100537 A1* | 4/2015 | Grieves | G06N 5/02 |
| | | | 706/52 |
| 2016/0004413 A1* | 1/2016 | Leydon | G07F 17/3244 |
| | | | 715/838 |

FOREIGN PATENT DOCUMENTS

| | | |
|---|---|---|
| CN | 102918532 A | 2/2013 |
| CN | 104063427 A | 9/2014 |
| CN | 104704863 A | 6/2015 |
| CN | 105103117 A | 11/2015 |
| JP | 2005025413 A | 1/2005 |

OTHER PUBLICATIONS

"Notice of Allowance Issued in Chinese Patent Application No. 201780023615.8", dated Oct. 19, 2022, 11 Pages.

Cheng, et al., "Actively Predicting Diverse Search Intent from User Browsing Behaviors", In Proceedings of the 19th International Conference on World Wide Web, Apr. 26, 2010, pp. 221-230.

Wen, et al., "OMG UR Funny! Computer-Aided Humor with an Application to Chat", In Proceedings of the Sixth International Conference on Computational Creativity, Jun. 2015, pp. 86-93.

Yang, Yu, "Corpus-based Joint Research in Environmental Discourse", In the Dissertation Submitted to School of Foreign Languages for the Doctorate Degree of Philosophy, May 26, 2013, 259 Pages.

Zhang, Yingying, "Research of Emotion Recognition Based on Combined Speech Feature", In Master's Thesis of Database Information Technology Series, Issue 4, Apr. 2011, 72 Pages.

* cited by examiner

INPUTTING IMAGES TO ELECTRONIC DEVICES

CLAIM OF PRIORITY

This application is a continuation application of U.S. patent application Ser. No. 15/183,226, filed Jun. 15, 2016, which claims priority to UK Patent Application Serial No. 1606379.4, filed on Apr. 13, 2016, which applications are incorporated herein by reference in their entirety.

BACKGROUND

Inputting images into an electronic device such as a smart phone, tablet computer, wearable computer or other electronic device is often time consuming and cumbersome for the end user. This is especially the case where images are to be input together with text to the electronic device, for example, to create a message to be sent to another electronic device or to author a document, web page, blog or other item. Often the electronic device is limited in size, such as in the case of a smart phone or wearable computer, making text and/or image input difficult for the end user.

In the texting and messaging environment, it has become popular for users to include images in word-based text. For example, it is common for users to enter text-based representations of images, known as emoticons, to express emotion such as :-) or ;-p [typical in the west] or (Λ_Λ) [typical in Asia]. More recently, small character sized images, called emojis have become popular. Stickers have also become popular. A sticker is a detailed illustration of a character that represents an emotion or action that is a mix of cartoons and emojis.

The Unicode (6.0) standard allocates 722 code points as descriptions of emojis (examples include U+1 F60D: Smiling face with heart shaped eyes and U+1 F692: Fire engine). Specified images are used to render each of these Unicode characters so that they may be sent and received. Although it is popular to input emojis, it remains difficult to do so, because the user has to discover appropriate emojis and, even knowing the appropriate emoji, has to navigate through a great number of possible emojis to find the one they want to input.

The embodiments described below are not limited to implementations which solve any or all of the disadvantages of known processes and/or apparatus for inputting images to electronic devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computing device is described which has a memory storing text input by a user. The computing device has a processor which is configured to send the text to a prediction engine having been trained to predict images from text. The processor is configured to receive from the prediction engine, in response to the sent text, a plurality of predictions, each prediction comprising an image predicted as being relevant to the text. The processor is configured to insert a plurality of the images into the text on the basis of criteria comprising one or more of: ranks of the predictions, categories of the images, rules associated with one or more of the images, user input, a trigger word. The processor is configured to insert the plurality of images into the text sequentially, in an order corresponding to ranks of the predictions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In the examples described herein an end user is able to insert relevant images to an electronic device with minimal effort. The user inputs text to the electronic device and the text is used by a prediction engine to predict images which are relevant to the text. In some examples the prediction engine also predicts text such as characters, words or phrases likely to follow the text input by the user so far. One or more of the predicted images are automatically inserted into the text which has been input by the user so that there is minimal effort on the part of the user. The insertion of the images is controlled by various criteria such as ranks of the predictions, categories of the images, rules associated with one or more of the images, user input, a trigger word or words.

In this way the user does not have the burden of operating an emoji selection panel, in which emojis are organized into several categories which can be scrolled through. Emoji selection panels are complex and time consuming to operate since although the emojis are grouped into categories, the user is still required to search through the emojis of various categories in order to find the emoji they want to use. Some emojis are not easily classified which further exacerbates the problem.

In the examples described herein the user does not have to provide shorthand text that identifies a particular emoji and does not need to type in an exact description of an emoji. In this way the end user is able to insert relevant images to an electronic device with minimal effort.

Figure 1:
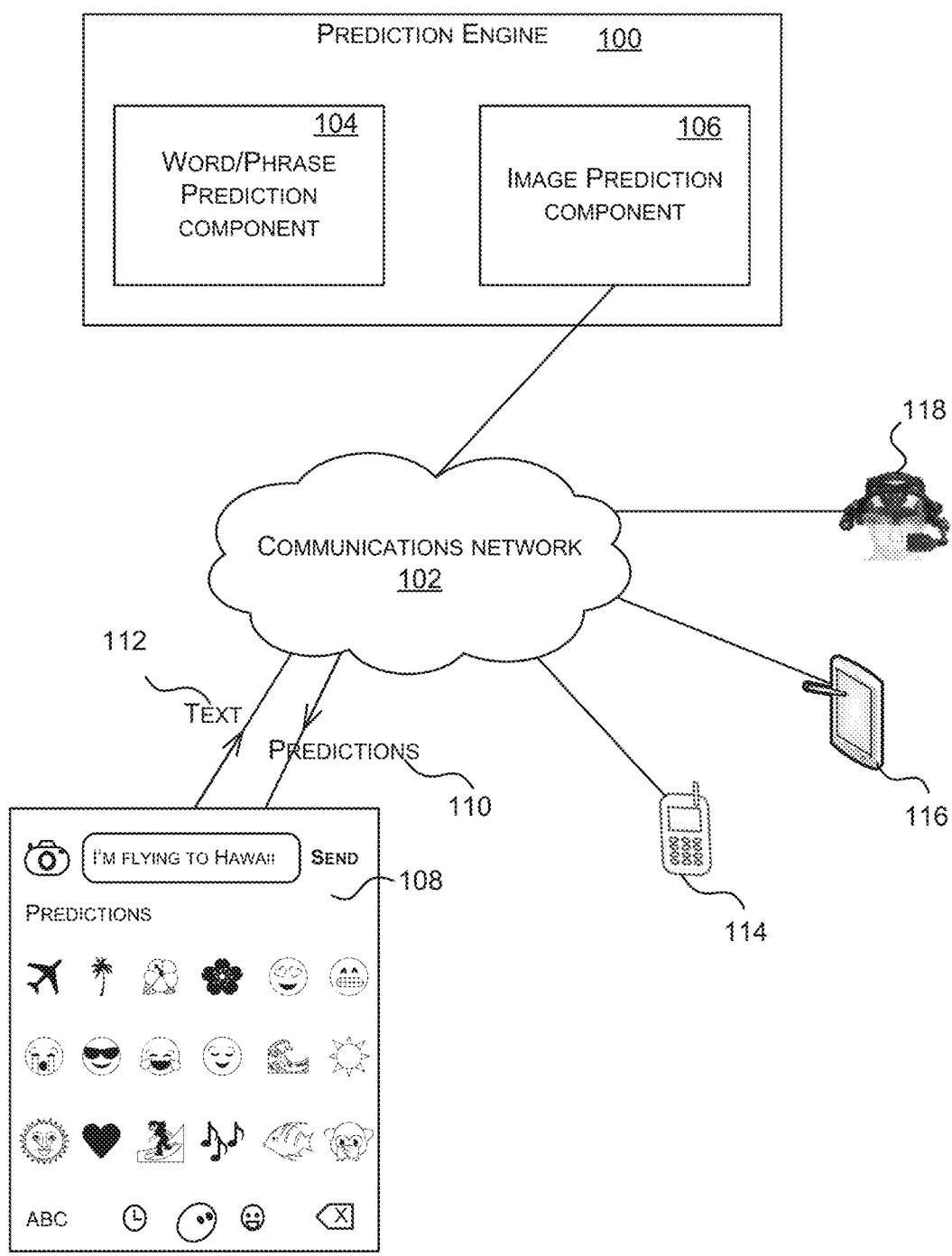
FIG. 1 is a schematic diagram of a prediction engine deployed as a service for end user computing devices to facilitate image input at the end user computing devices.

FIG. 1 is a schematic diagram of a prediction engine deployed as a service for end user computing devices to facilitate image input at the end user computing devices. The term "image" is used to refer to any type of two dimensional graphical representation sized and shaped for insertion amongst text and a non-exhaustive list of examples is: a photograph, a logo, a drawing, an icon, an emoji, an emoticon, a sticker, a pictogram, an ideogram, a cartoon, or any other image sized and shaped for insertion amongst text. In various examples described below the image is an emoji.

End user devices such as mobile telephones 108, 114, tablet computers 116, wearable computers 118, laptop computers or other end user electronic devices are connected to a communications network 102 via wired or wireless links. The communications network 102 is the internet, an intranet, or any wired or wireless communications network. Also connected to the communications network is a prediction engine 100 comprising an image prediction component 106 which has been trained to predict, for given text input, a plurality of images which are relevant to the given text input. In some examples the prediction engine 100 also has a word/phrase prediction component 104 which is configured to predict, given text input, text characters, words or phrases, which are likely to follow the given text input. The prediction engine is implemented using any of software, hardware and firmware and has a communications interface arranged to receive text 112 from an end user computing device 108, 114, 116, 118 and to send predictions 110 to the end user computing devices. The predictions comprise images and, in some examples, text characters, words or phrases. In some examples the predictions are ranked according to their probability or likelihood of being relevant to the text 112 input by the user. In some examples, tens or dozens of ranked predictions are returned by the prediction engine 100 to an end user device in response to a single instance of text input. The single instance of text input is a key stroke, character, phoneme, morpheme, word, phrase, sentence or other unit of text.

Figure 9:
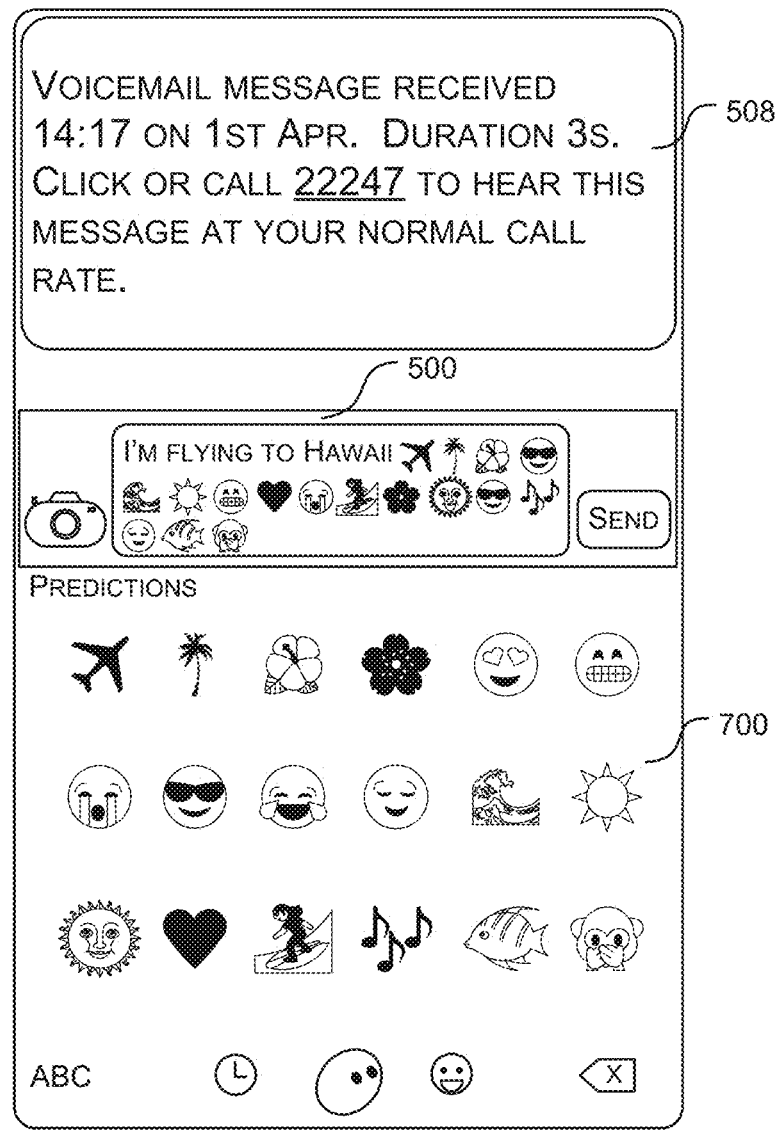
FIG. 9 is a schematic diagram of the user interface of FIG. 8 in the case where emojis have been inserted to text.
Figure 10:
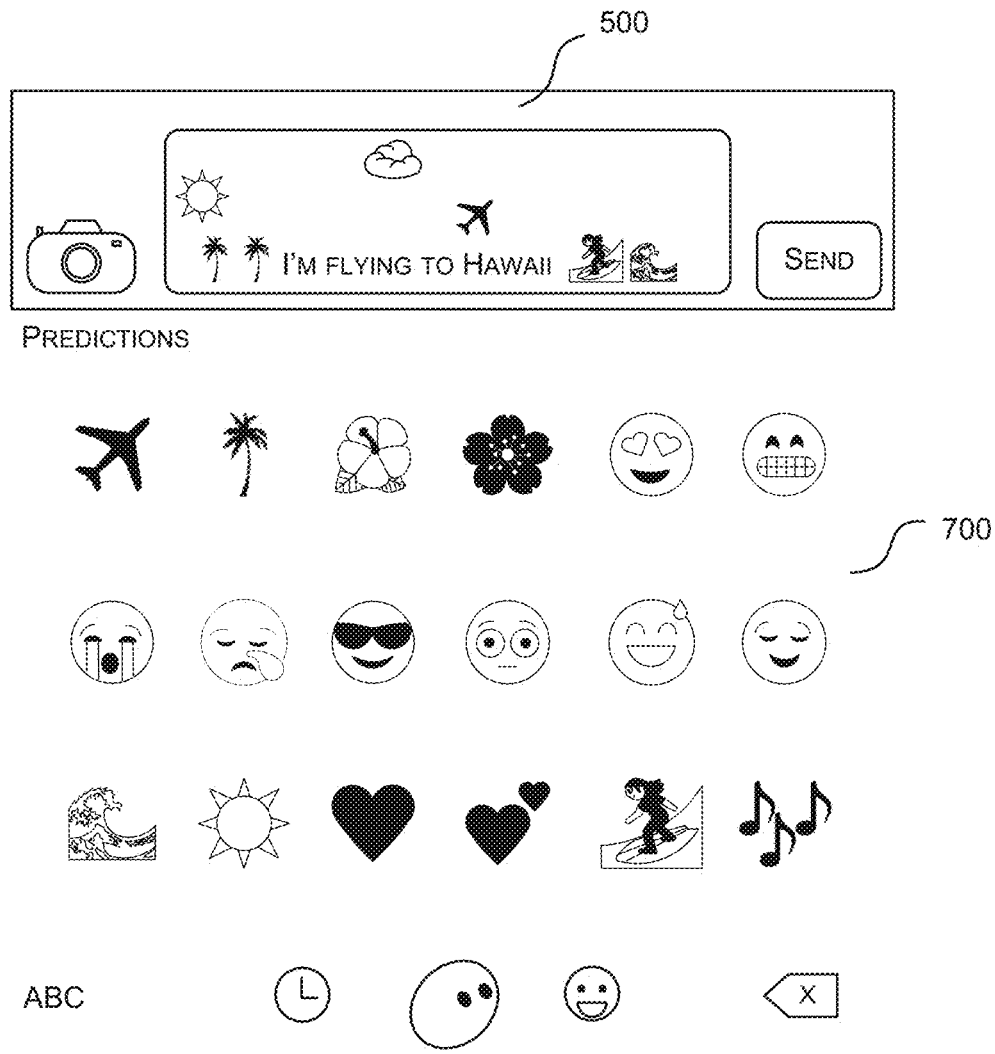
FIG. 10 is a schematic diagram of the user interface of FIG. 7 in the case where emojis have been inserted to text using rules.

Once the end user computing device receives the plurality of predictions it inserts the predicted images into the text which has been input by the user. This is done automatically according to criteria so that burden on the user is reduced whilst enabling control through the criteria. The criteria are preconfigured or set dynamically. FIG. 9 shows an example in which text input by an end user is "I'm flying to Hawaii" and eighteen images have been automatically inserted immediately following the text. In this example the images follow the text but it is also possible for the images to precede the text or to be interspersed through the text. For example, FIG. 10 shows a situation where images have been automatically inserted before, after and above text.

The criteria are used to control factors such as when the automatic image insertion occurs, for how long the automatic image insertion occurs, when the automatic image insertion stops, the locations within the text at which images are to be insert relative to the text, the locations within the text at which images are to be inserted relative to one another, the time order in which the images are to be inserted and other factors. For example, in some cases a single user interaction such as a single long press on the keyboard display is used to initiate the image insertion process. The speed of insertion of the images is controlled by the duration of the single user interaction (single long press on the keyboard) in some cases. This simplifies user interface interaction for an end user on a mobile device such as smart phone, tablet computer or wearable computer.

A prediction tool at the end user computing device has access to the criteria and is configured to control the end user computing device so that the images are automatically inserted to the text using the criteria. For example, the prediction tool is software, hardware or firmware at the end user computing device.

It is noted that the deployment of FIG. 1 is one example only and that in some examples the prediction engine is integral with the end user computing device.

Figure 2:
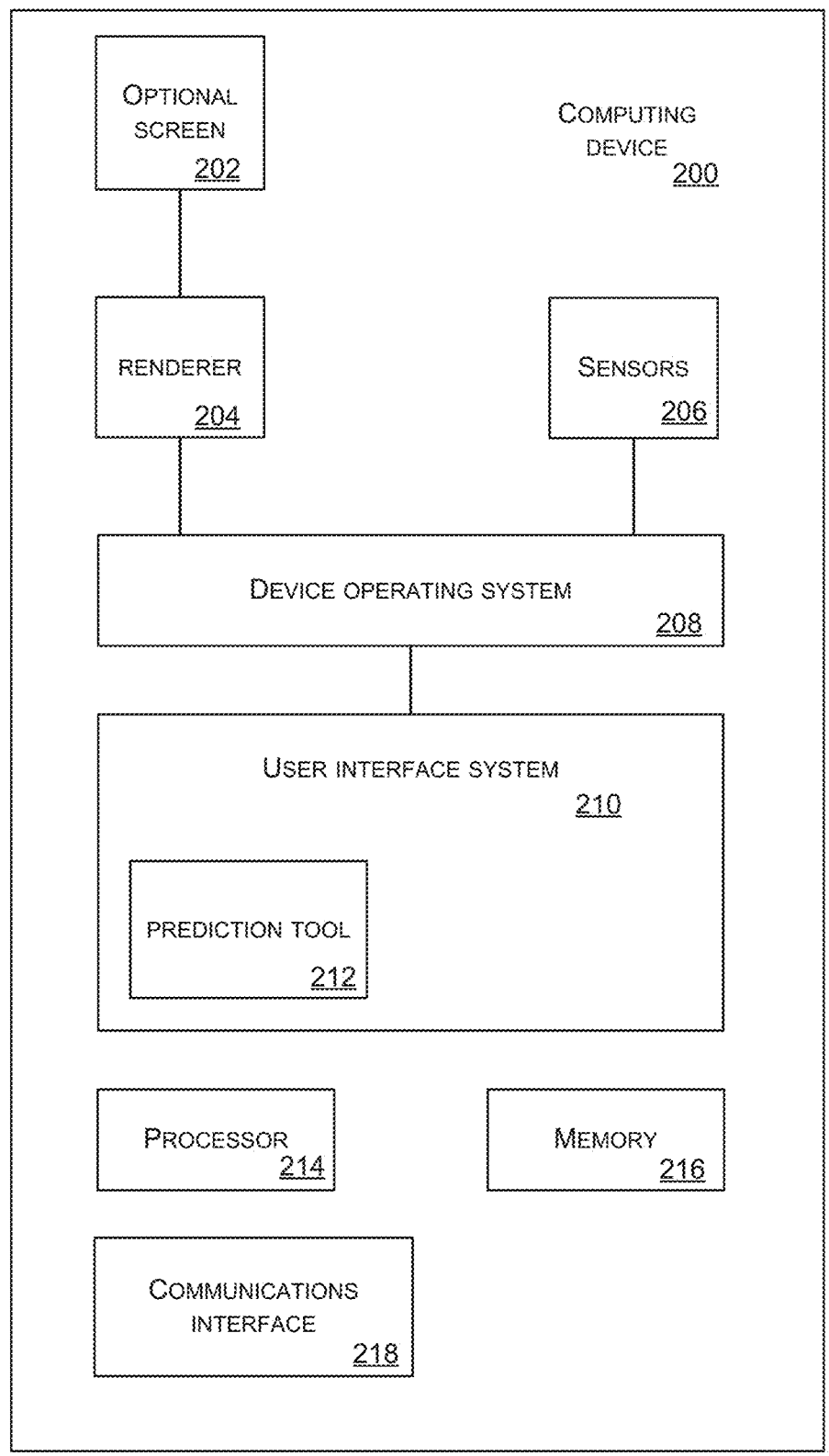
FIG. 2 is a schematic diagram of an end user computing device having a prediction tool to facilitate image input at the end user computing device.

FIG. 2 is a schematic diagram of an end user computing device such as a wearable computer, augmented reality head worn computer, mobile phone, tablet computer or other end user computing device. A prediction tool 212 is provided within a user interface system 210 which controls a display. The display is a screen 202 in some cases or a virtual reality or augmented reality display which projects into the environment or into the user's eye in some cases. The computing device 200 has one or more sensors 206 such as a touch screen, a microphone, cameras, or other sensors which detect user input to enable a user to input text and make selections regarding criteria for image input. The sensors provide input to a device operating system 208 which is connected to the user interface system 210. The device operating system 208 controls a renderer 204 configured to render graphical content such as a graphical user interface to optional screen 202 or to any other means for displaying graphical content to an end user. The end user computing device 200 has a memory 216, one or more processors 216 and a communications interface 218. The end user computing device has various other components which are not illustrated for clarity and are described in more detail below with reference to FIG. 13.

Alternatively, or in addition, the functionality of the prediction tool 212 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
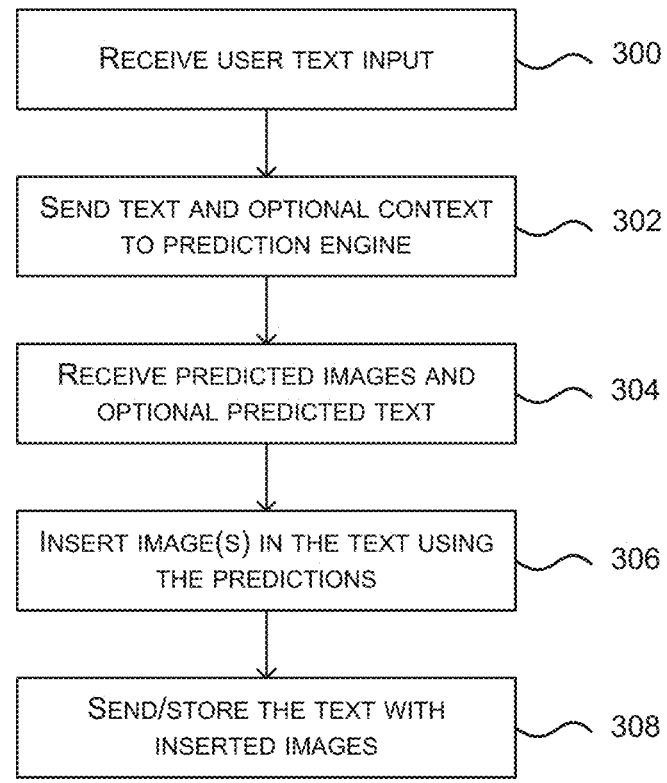
FIG. 3 is a flow diagram of a method of operation at the prediction tool of FIG. 2.

FIG. 3 is a flow diagram of a method at the prediction tool 212 of FIG. 2. User text input is received 300 for example, where the user types in the text using a physical keyboard or a soft keyboard displayed on a touch screen. In another example, the user speaks text input and it is received using a microphone. In another example, the user points to a display of a keyboard or graphical user interface which is projected using an augmented reality computing device or virtual reality computing device. One or more cameras are used to detect the user pointing and the selected user input is computed.

In some examples the text input is received as part of a text messaging application executing on the end user computing device, although this is not essential. The text input may be received as part of a document authoring application or in any other context. The text input is received by sensors 206 and conveyed to user interface system 210 and is accessible to prediction tool 212.

In some examples, one or more candidate text predictions are presented to the end user by the user interface system 210 so that the user is able to select these candidate text predictions (which may be whole word or whole phrase predictions) in order to input text more efficiently.

The end user computing device sends 302 the text which has been received from the user, and any optional context, to the prediction engine. The optional context comprises information such as text previously entered by the user, images frequently used by the user to insert into text, images recently used by the user to insert into text or other context data about the text input and any associated image.

In response, the end user computing device receives 304 a plurality of predicted images (predicted as being relevant to the text), and optionally received predicted text which is predicted as likely to be input next by the user. In some examples, the predicted images include images predicted as being relevant to candidate text predictions. Tens or dozens of predicted images may be received, or any other suitable number of predicted images. In some examples the predicted images are ranked according to their predicted relevance.

The end user computing device, prediction tool 212 inserts 306 one or more of the received predicted images in the text. This part of the process is described in more detail with reference to FIG. 4 below. The text with the inserted images is then stored 308 or sent to another entity. For example, in the case of a text messaging application, the text with the inserted images is sent to another end user computing device as a text message. However, this is not essential as other types of message are used in other types of situation, such as email messages, social media messages, or other messages.

Figure 4:
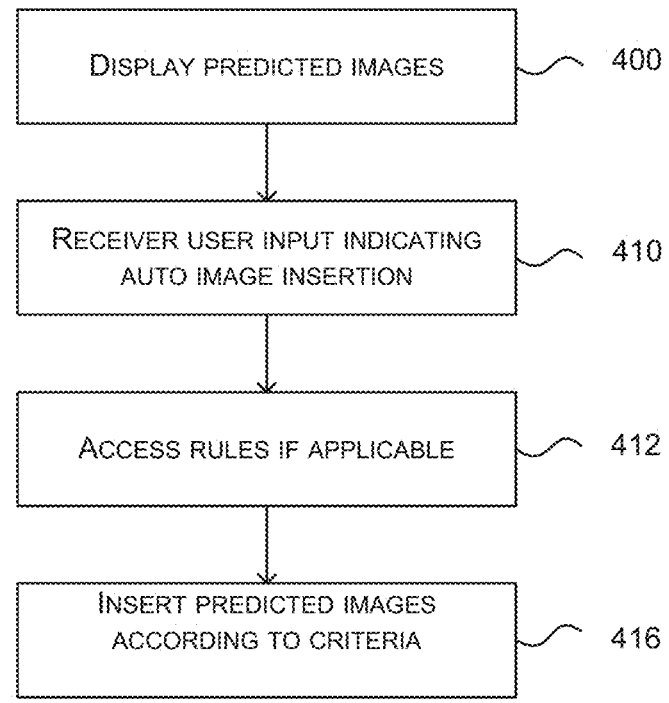
FIG. 4 is a flow diagram of part of the method of FIG. 3 in more detail.
Figure 7:
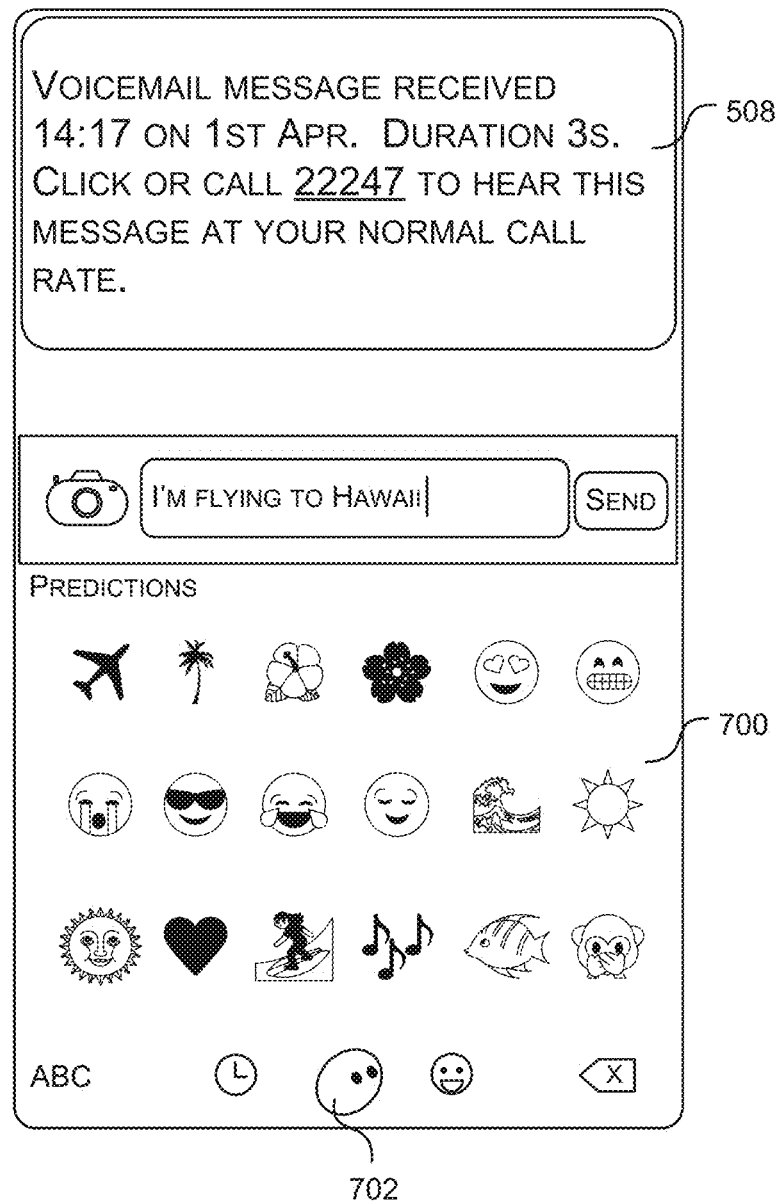
FIG. 7 is a schematic diagram of a user interface of an end user computing device having a predictive emoji keyboard.

With reference to FIG. 4 the process of inserting one or more of the predicted images in the text comprises displaying 400 the predicted images in some examples. For example, as shown in FIG. 7, predicted images are displayed in a pane 700 adjacent to a text input region 500. The prediction tool 212 receives 410 user input indicating automated image insertion is selected by the user. The user input is of any suitable type such as touch input on a touch screen, pointing input on an augmented reality user interface, voice input, or other user input. In some examples the user input is used to control one or more of: when the image insertion process begins, when the image insertion process ends, a speed of the image insertion process, an acceleration of the image insertion process.

The prediction tool accesses 412 rules associated with the predicted images if these are available. For example, the prediction tool accesses a memory at the end user computing device, or at another entity, which stores rules associated with images. The prediction tool proceeds to insert 416 one or more of the predicted images into the text according to criteria. The criteria are stored at the end user computing device or at another entity accessible by the end user computing device. In some examples the criteria are user configurable. In some examples the criteria are dynamically adjusted. The criteria comprise one or more of: ranks of the predictions, categories of the images, rules associated with one or more of the images, user input, one or more trigger words.

In some examples, where the plurality of predictions are ranked the processor is configured to insert one or more of the images into the text sequentially, in an order corresponding to the ranks of the predictions. In this case the criteria comprise ranks of the predictions. In some examples, both ranks of the predictions and categories of the images are used as the criteria. For example, each image has metadata associated with it indicating to which of a plurality of categories it belongs. The prediction tool is arranged in some cases to insert the images into the text sequentially, in an order computed using both the ranks of the predictions and the categories of the images.

In some examples the criteria concern positions of the inserted images relative to one another. For example, the ranks are used to specify an ordering of the inserted images relative to one another. In some examples both the ranks and the categories of the images are used to calculate the ordering of the inserted images relative to one another.

In some examples the criteria comprise detection of a trigger word as part of the text input by the user. For example, the prediction tool at the end user device has access to a memory storing trigger words and if it detects one of these trigger words in the input text, it initiates the automated process of image insertion.

In some examples the prediction tool is arranged to give feedback to the end user to indicate that the image insertion process is about to begin. For example, tactile feedback, auditory feedback or visual feedback. In the case of visual feedback the predicted images are rendered such that they shake in some examples.

Where rules are available these are used as criteria to determine locations in the text at which to insert the plurality of images. For example, an image of an airplane is associated with a rule specifying that the image be displayed above text which is predicted to be relevant to the image. For example, an image of the sun is associated with a rule specifying that the image be displayed above text which is predicted to be relevant to the image.

An example of a user interface at an end user computing device with a prediction tool 212 is now given with reference to FIGS. 5 to 10. This is one example only and others are possible. In this example a computing device has a touch screen and is executing a messaging application whereby a user has received a message, and is entering text to reply to the received message. Images are to be inserted with the text to form the reply message.

Figure 5:
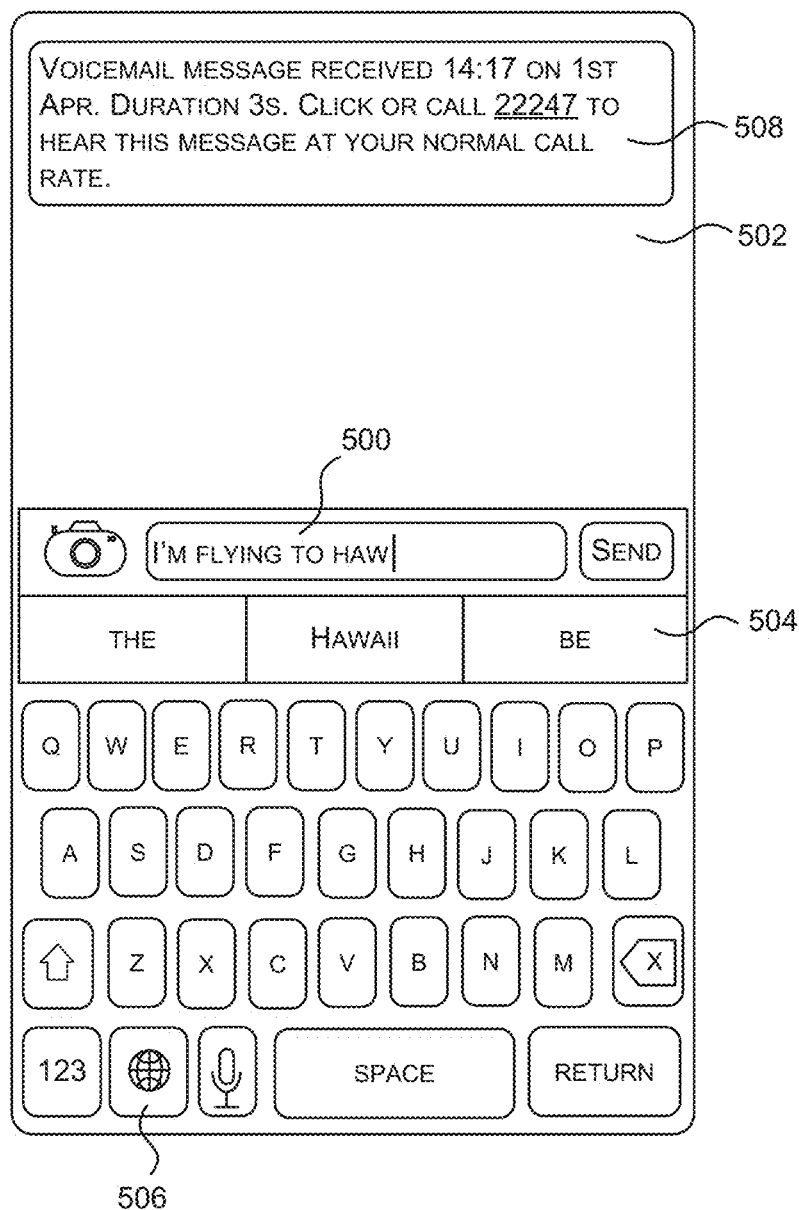
FIG. 5 is a schematic diagram of a user interface of an end user computing device having a prediction tool.

FIG. 5 is a schematic diagram of a user interface of an end user computing device having a prediction tool. The user interface comprises a graphically displayed keyboard, a text input box 500, a messaging pane 502 and one or more candidate prediction buttons 504. The messaging pane shows a message 508 which has been received and to which a reply is being formulated. The user has entered the text "I'm flying to haw" in the text input box 500 and candidate prediction buttons 504 currently display the predictions "the", "Hawaii" and "be". The words shown on the candidate prediction buttons are determined according to predicted text received from the prediction engine.

Figure 6:
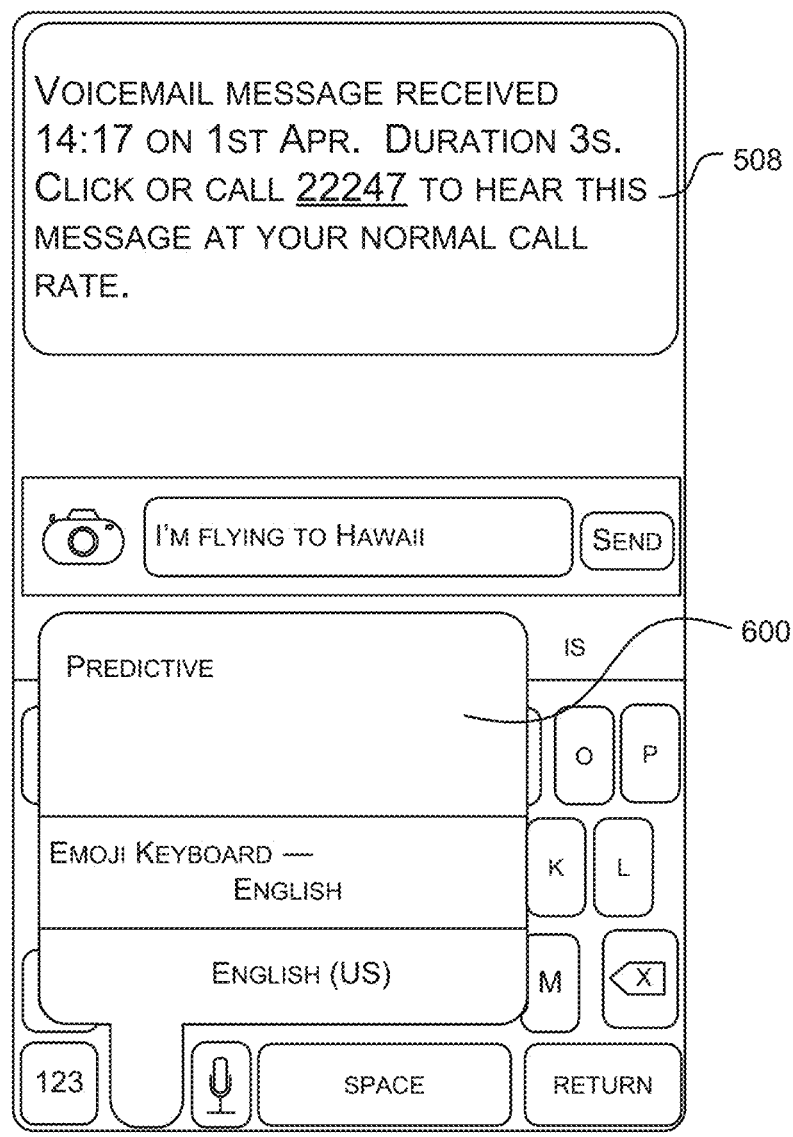
FIG. 6 is a schematic diagram of the user interface of FIG. 5 in the situation where a predictive emoji keyboard is selected.

The user interface includes a function button 506 which when selected by the end user causes a display such as that of FIG. 6. This enables the end user to access a predictive emoji keyboard to simplify input of images associated with the text. FIG. 6 is a schematic diagram of the user interface of FIG. 5 in the situation where a predictive emoji keyboard is selected by selecting menu item 600.

Once the predictive emoji keyboard has been selected it is displayed as indicated in FIG. 7 which shows the QWERTY soft keyboard replaced by a pane 700 of emojis, where the emojis are images predicted by the prediction engine and received at the end user computing device. In this example there are eighteen predicted emojis although other numbers are used in other examples. In some example the emojis are displayed in the pane 700 in ranked order according to the ranks of the predictions. In other examples, such as that of FIG. 7 the emojis are displayed in an order based on both the ranks of the predictions and categories of the emojis. For example, the palm tree, and flowers are grouped together in the top row of the pane 700 even though the rank of at least one of the flowers is lower.

At the bottom of the pane 700 is an icon 702 which when selected by the user causes the image insertion process to begin. In some examples, a long touch of this icon causes the image insertion process to begin. In some example, the image insertion process occurs only whilst this icon is being touched by the user and speeds up as the icon is touched for longer. Icons are also available at the bottom of pane 700 to enable the user to delete emojis or access more emojis.

Figure 8:
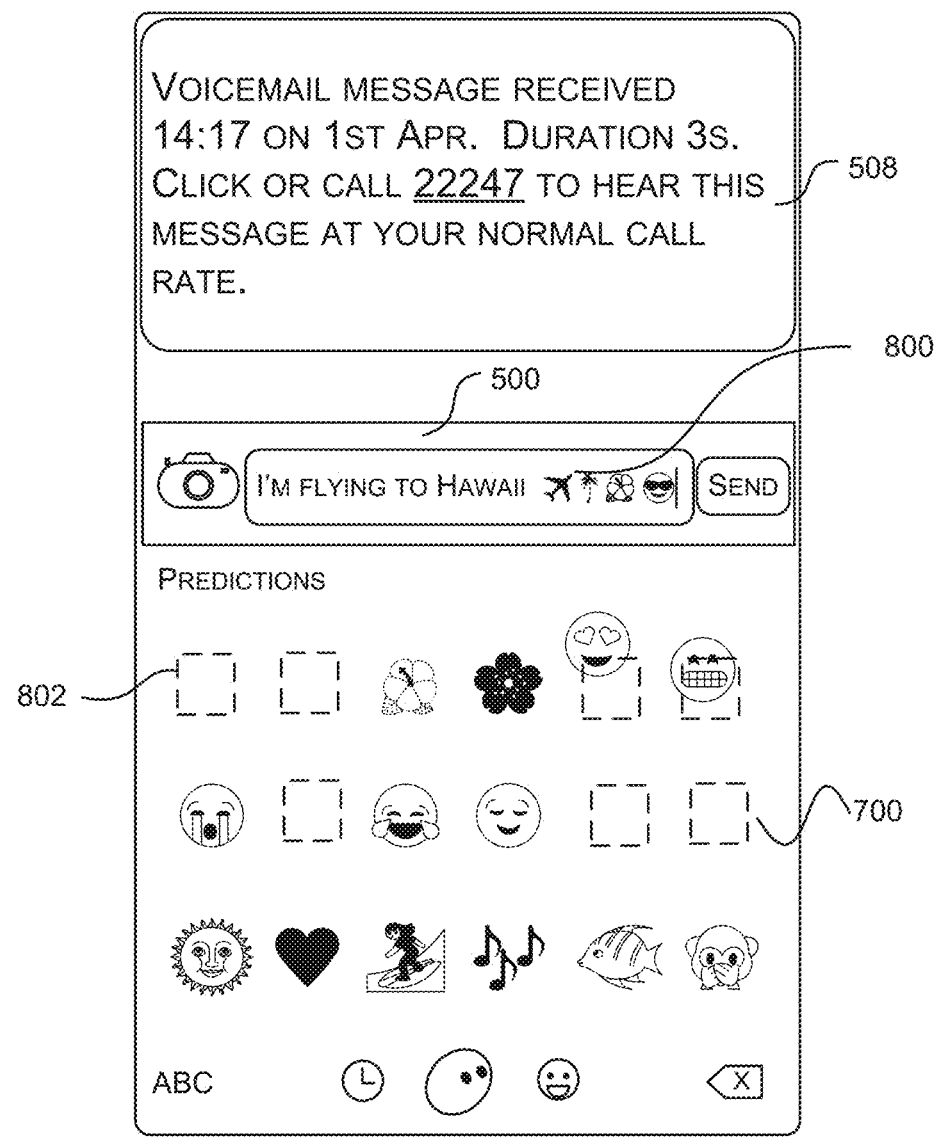
FIG. 8 is schematic diagram of the user interface of FIG. 7 in the case where emojis are being inserted to text.

Once the user has touched and held icon 702 the emojis in pane 700 shake to give visual feedback to the user that the image insertion process is commencing. The emojis in the pane then fly to a point above the pane 700 to mimic flying into the context. An alpha channel imprint is left in the place of the emoji in the pane 700 and the image of the emoji is inserted in to the text input box 500. As indicated in FIG. 8 more than four emojis have been inserted into the text as there are five emojis from the pane 700 missing and with their alpha channel imprints left. Alpha channel imprint 802 (represented as a dotted square for ease of representation but in practice the outline of the shape would be the same as the outline of the emoji) is an example for the case of the airplane emoji. At least two of the emojis in the pane are in transition from the pane to the text as indicated by the emojis in the two right most positions of the top row of pane 700. In these positions, the alpha channel imprints are partially visible and the emojis are shifted in position towards the text input box 500.

FIG. 9 is a schematic diagram of the user interface of FIG. 8 in the case where emojis have been inserted to text. Here all eighteen emojis have been inserted at the end of the text. After insertion the alpha channel imprints are filled with the predicted images. The example of FIG. 9 where the emojis are inserted at the end of the text is one example only as the emojis are inserted at any one or more of: before the text, after the text, interspersed with the text, above the text, below the text.

FIG. 10 is a schematic diagram of the user interface of FIG. 7 in the case where emojis have been inserted to text using rules. In this case the emojis depicting the sun, a cloud and an airplane each have a rule specifying location above relevant text. The palm tree emoji has a rule indicating insertion before text and the surfing and sea emojis have a rule indicating insertion after relevant text.

The user interface described with reference to FIGS. 5 to 10 enables the user to insert relevant images to an electronic device with minimal effort.

More detail about the prediction engine 100 is now given. The prediction engine 100 comprises a language model in some examples. The prediction engine comprises a search engine in some examples. The prediction engine comprises a classifier in some examples.

Figure 11:
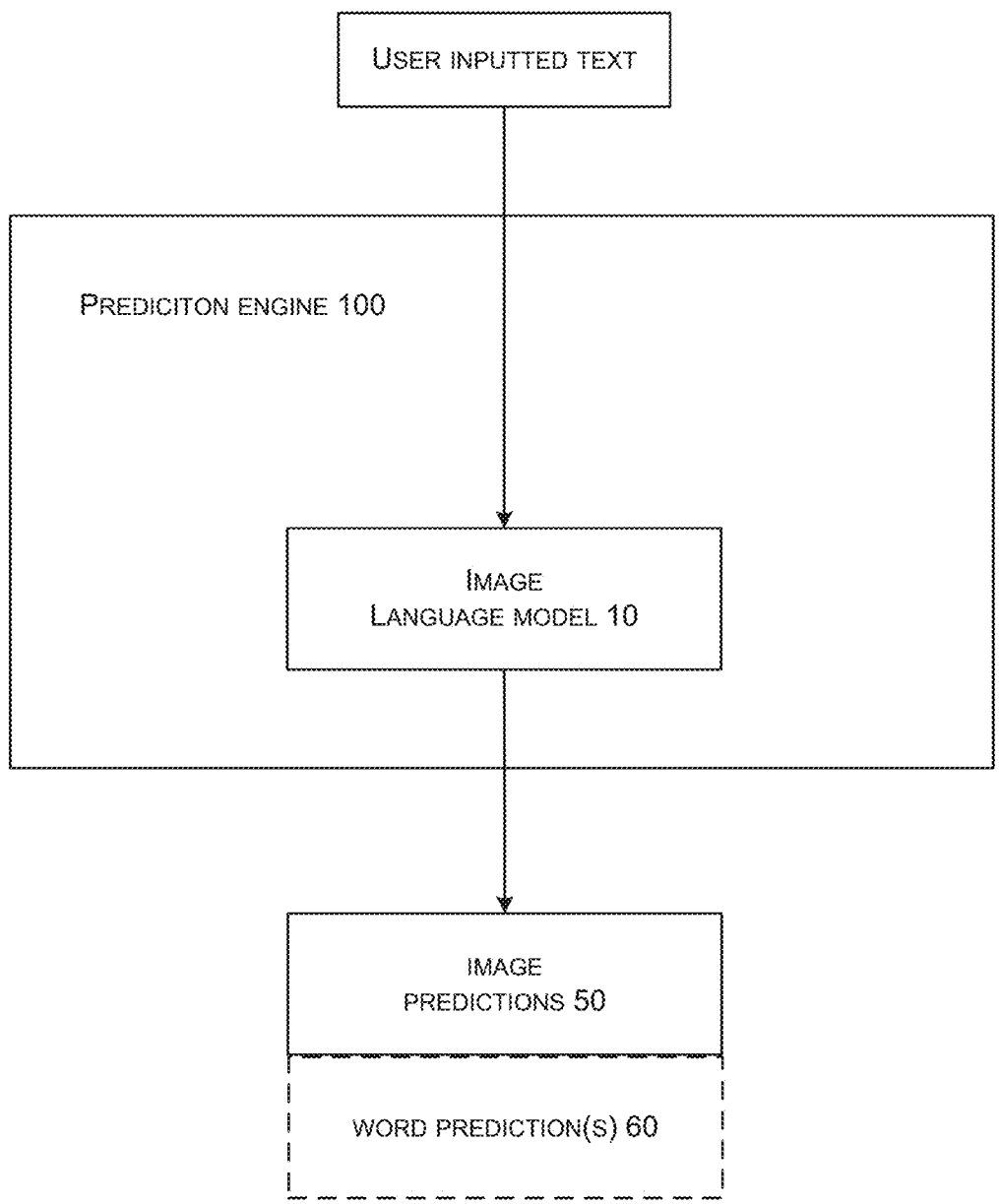
FIG. 11 is a schematic diagram of a prediction engine such as that of FIG. 1.

FIG. 11 illustrates the situation in the case that the prediction engine 100 comprises a language model 10. The prediction engine 100 comprises an image language model 10 to generate image predictions 50 and, optionally, word prediction(s) 60. The image language model 10 may be a generic image language model, for example a language model based on the English language, or may be an application-specific image language model, e.g. a language model trained on SMS messages or email messages, or any other suitable type of language model. The prediction engine 100 may comprise any number of additional language models, which may be text-only language models or an image language model.

If the prediction engine 100 comprises one or more additional language models, the predication engine 100 comprises a multi-language model 30 (Multi-LM) to combine the image predictions and/or word predictions, sourced from each of the language models to generate final image predictions 50 and/or final word predictions 60 that may be provided to a user interface for display and user selection. The final image predictions 50 are preferably a set (i.e. a specified number) of the overall most probable predictions.

If the additional language model is a standard word-based language model, it is used alongside the image-based language model 10, such that the prediction engine 100 generates an image prediction 50 from the image language model 10 and a word prediction 60 from the word-based language model. If preferred, the image/word based language model 10 may also generate word predictions which are used by the Multi-LM 30 to generate a final set of word predictions 60. Since the additional language model 20 of this embodiment can predict words only, the Multi-LM 30 is not needed to output final image predictions 50. The word-based language model 104 of FIG. 1 may be replaced by any suitable language model for generating word predictions, which may include language models based on morphemes or word-segments.

If the additional language model 104 of FIG. 1 is an additional image language model, then the Multi-LM 30 can be used to generate final image predictions 50 from image predictions sourced from both language models. The Multi-LM 30 may also be used to tokenise user inputted text.

An example of an image language model 10 will be described with reference to FIG. 12 which illustrate schematics of image language models which receive user inputted text and return image predictions 50 (and optionally word/term predictions 60).

There are two possible inputs into a given language model, a current term input 11 and a context input 12. The language model may use either or both of the possible inputs. The current term input 11 comprises information the system has about the term the system is trying to predict, e.g. the word the user is attempting to enter (e.g. if the user has entered "I am working on ge", the current term input 11 is 'ge'). This could be a sequence of multi-character keystrokes, individual character keystrokes, the characters determined from a continuous touch gesture across a touchscreen keypad, or a mixture of input forms. The context input 12 comprises the sequence of terms entered so far by the user, directly preceding the current term (e.g. "I am working"), and this sequence is split into 'tokens' by the Multi-LM 30 or a separate tokeniser (not shown). If the system is generating a prediction for the nth term, the context input 12 will contain the preceding n-1 terms that have been selected and input into the system by the user. The n-1 terms of context may comprise a single word, a sequence of words, or no words if the current word input relates to a word beginning a sentence. A language model may comprise an input model (which takes the current term input 11 as input) and a context model (which takes the context input 12 as input).

Figure 12:
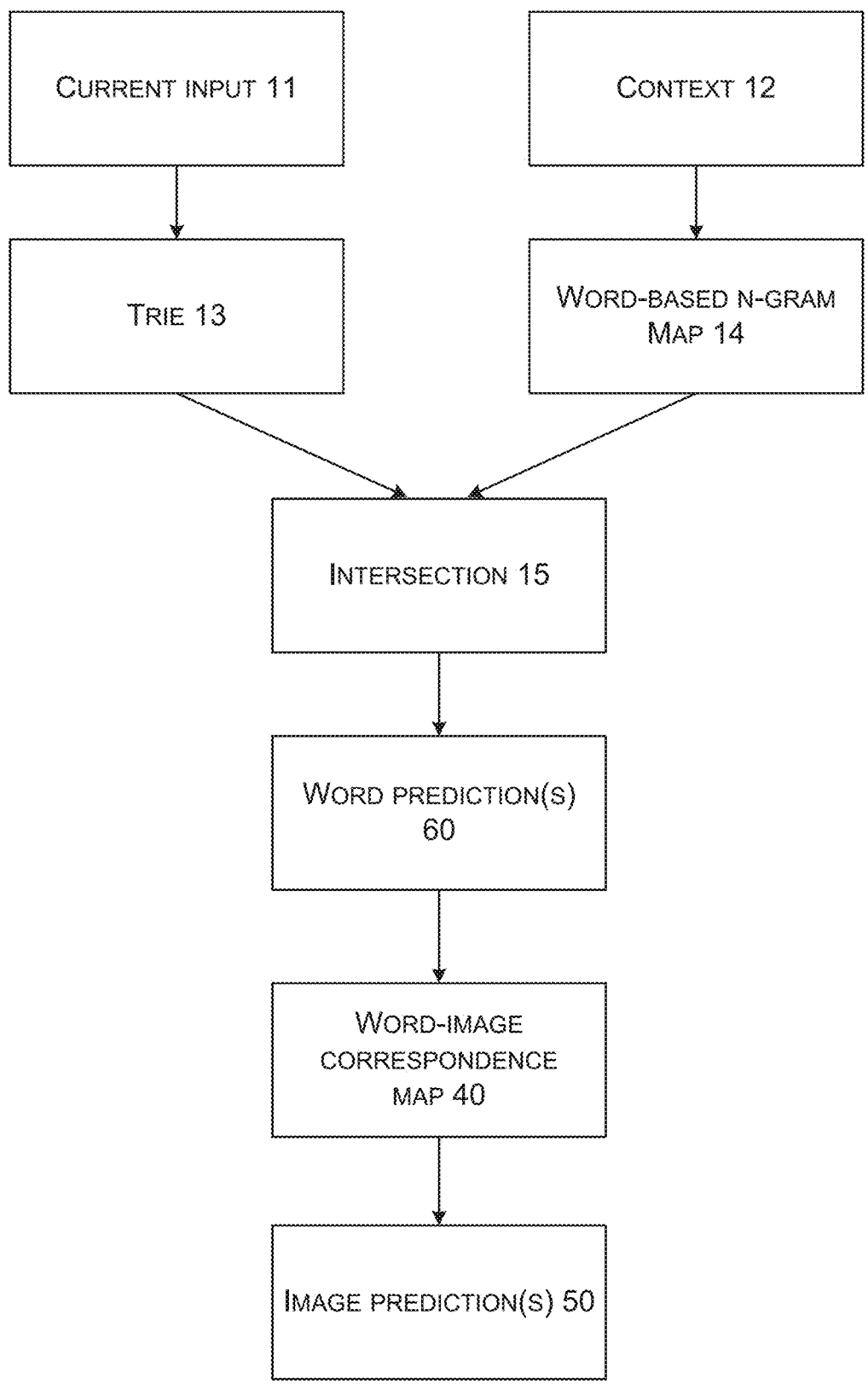
FIG. 12 is a schematic diagram of an example of the image language model of FIG. 11 in more detail.

In the example illustrated in FIG. 12, the language model comprises a trie 13 (an example of an input model) and a word-based n-gram map 14 (an example of a context model) to generate word predictions from current input 11 and context 12 respectively. The language model of FIG. 12 comprises an intersection 15 to compute a final set of word predictions 60 from the predictions generated by the trie 13 and n-gram map 14. The trie 13 can be a standard trie or an approximate trie which is queried with the direct current word-segment input 11. Alternatively, the trie 13 can be a probabilistic trie which is queried with a KeyPressVector generated from the current input. The language model can also comprise any number of filters to generate the final set of word predictions 60. If desired, the intersection 15 of the language model 10 is configured to employ a back-off approach if a candidate predicted by the trie has not been predicted by the n-gram map also, rather than retaining only candidates generated by both. Each time the system has to back-off on the context searched for, the intersection mechanism 15 applies a 'back-off' penalty to the probability (which may be a fixed penalty, e.g. by multiplying by a fixed value). In this embodiment, the context model (e.g. the n-gram map) may comprise unigram probabilities with the back-off penalties applied.

The language model of FIG. 12 includes a word→image correspondence map 40, which maps each word of the language model 10 to one or more relevant images/labels, e.g. if the word prediction 60 is 'pizza', the language model outputs an image of a pizza (e.g. the pizza emoji) as the image prediction 50.

In some examples the word to image correspondence map is not needed since the n-gram map of the language model is trained on source data comprising images embedded in sections of text. In this case, the n-gram map the emojis are treated like words to generate the language model, i.e. the n-gram map comprises emojis in the context in which they have been identified. The n-gram map comprises the probabilities associated with sequences of words and emojis, where emojis and words are treated in the same manner. In some cases the n-gram map with emojis is used without the trie 13 so that images are predicted without the need for the current input. In some cases the n-gram map with emojis is used with the trie 13 so that the intersection is computed to yield the word predictions and the image predictions (without the need for the correspondence map).

In the case that a search engine is used as the prediction engine, the search engine has an image database comprising a statistical model associated with each image. The statistical models have been trained on sections of text associated with the particular image for that model. The statistical model is a text only language model in some examples.

In some examples the prediction engine comprises a classifier which has been trained on text data that has been pre-labeled with images. Any suitable type of machine learning classifier may be used which identifies to which of a set of categories a new observation belongs, on the basis of a training set of data containing observations or instances whose category membership is known.

Figure 13:
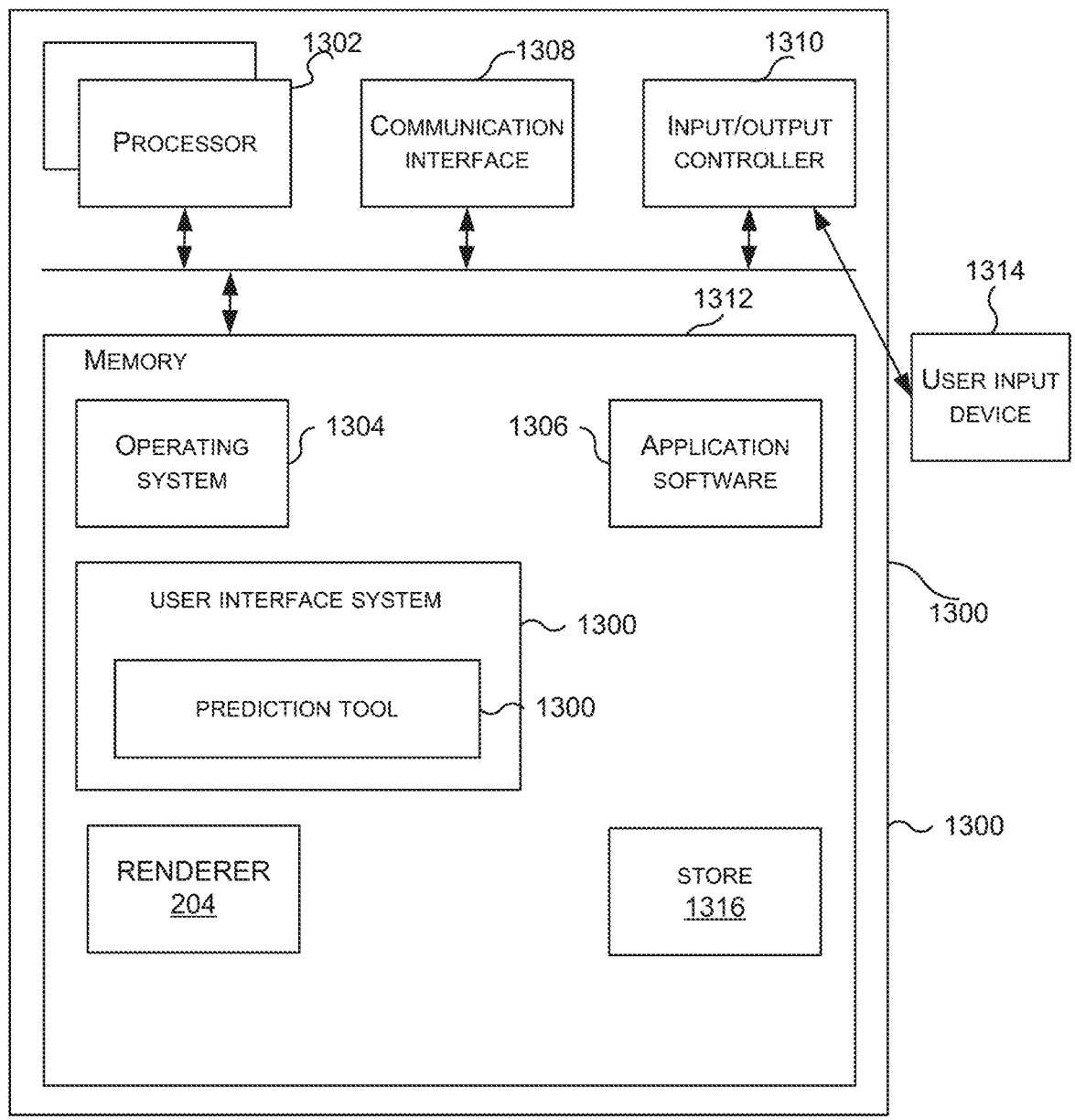
FIG. 13 illustrates an exemplary computing-based device in which embodiments of the text/image prediction tool of FIG. 1 are implemented.

FIG. 13 illustrates various components of an exemplary computing-based device 1300 which are implemented as any form of a computing and/or electronic device, and in which embodiments of a prediction tool for inputting images to the computing-based device are implemented in some examples.

Computing-based device 1300 comprises one or more processors 1302 which are microprocessors, controllers or any other suitable type of processors for processing computer executable instructions to control the operation of the device in order to input images such as emojis to the device, where the images are relevant to text input by the user. In some examples, for example where a system on a chip architecture is used, the processors 1302 include one or more fixed function blocks (also referred to as accelerators) which implement a part of the method of any of FIGS. 3 and 4 in hardware (rather than software or firmware). Platform software comprising an operating system 1304 or any other suitable platform software is provided at the computing-based device to enable application software 1306 to be executed on the device such as a messaging application or other application software. The computing-based device has a user interface system 1300 comprising a prediction tool 1300 as described with reference to FIG. 2. The computing-based device has a renderer 204 to render emojis and text and to render a graphical user interface. A store 1316 holds images, predictions, ranks, criteria and other data.

The computer executable instructions are provided using any computer-readable media that is accessible by computing based device 1300. Computer-readable media includes, for example, computer storage media such as memory 1312 and communications media. Computer storage media, such as memory 1312, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1312) is shown within the computing-based device 1312 it will be appreciated that the storage is, in some examples, distributed or located remotely and accessed via a network or other communication link (e.g. using communication interface 1308).

The computing-based device 1300 also comprises an input/output controller 1310 arranged to output display information to a display device which may be separate from or integral to the computing-based device 1300. The display information may provide a graphical user interface. The input/output controller 1310 is also arranged to receive and process input from one or more devices, such as a user input device 1314 (e.g. a mouse, keyboard, camera, microphone or other sensor). In some examples the user input device 1314 detects voice input, user gestures or other user actions and provides a natural user interface (NUI). This user input may be used to control automatic insertion of images, input text, set criteria, configure rules and for other purposes. In an embodiment the display device also acts as the user input device 1314 if it is a touch sensitive display device. The input/output controller 1310 outputs data to devices other than the display device in some examples, e.g. a locally connected printing device.

Any of the input/output controller 1310, display device and the user input device 1314 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computing device comprising:
a memory storing text input by a user:
a processor configured to send the text to a prediction engine having been trained to predict images from text;
the processor configured to receive from the prediction engine, in response to the sent text, a plurality of predictions, each prediction comprising an image predicted as being relevant to the text:
the processor configured to insert a plurality of the images into the text on the basis of criteria comprising one or more of: ranks of the predictions, categories of the images, rules associated with one or more of the images, user input, a trigger word; and wherein the processor is configured to insert the plurality of images into the text sequentially, in an order corresponding to ranks of the predictions.

The computing device described above wherein the processor is configured to insert the plurality of images into the text in a manner responsive to a single user interaction.

The computing device described above wherein the processor is configured to control the speed of the insertion of the plurality of images into the text according to the duration of the single user interaction.

The computing device described above wherein the processor is configured to insert the images into the text in an order based on the ranks of the predictions and based on categories of the images.

The computing device described above wherein the processor is configured to insert the images into the text with the positions of the inserted images relative to one another based on the ranks of the predictions.

The computing device described above wherein the processor is configured to insert the images into the text with the positions of the inserted images relative to one another based on the ranks of the predictions and based on categories of the images.

The computing device described above wherein the criteria comprise user input selecting an automated image insertion function.

The computing device described above wherein the processor is configured to insert the images only concurrently with the user input.

The computing device described above wherein the criteria comprise detection of a trigger word as part of the text.

The computing device described above wherein the predictions comprise at least one pair of co-occurring images, the prediction engine having been trained to predict pairs of co-occurring images.

The computing device described above wherein the criteria comprise one or more rules associated with an image, the processor being configured to access one or more rules from a memory for at least one of the predictions, and to insert the at least one predicted image into the text at a location selected using the one or more rules.

The computing device described above wherein the processor is configured to provide feedback to the user when insertion of the images is going to commence.

The computing device described above wherein the processor is configured to provide feedback to the user about progress of the insertion of the images.

The computing device described above wherein the predictions additionally comprise predicted words or predicted phrases, and wherein the processor is configured to offer for input predicted images associated with the predicted words or predicted phrases.

The computing device described above wherein the prediction engine is integral with the computing device.

A computing device comprising:
means for storing text input by a user;
means for sending the text to a prediction engine having been trained to predict images from text;
means for receiving from the prediction engine, in response to the sent text, a plurality of predictions, each prediction comprising an image predicted as being relevant to the text; and
means for inserting a plurality of the images into the text sequentially in an order based on ranks of the predictions and on the basis of criteria comprising one or more of: ranks of the predictions, categories of the images, rules associated with one or more of the images, user input, a trigger word.

A computer-implemented method comprising:
storing, at a memory, text input by a user;
sending the text to a prediction engine having been trained to predict words and images from text;
receiving from the prediction engine, in response to the sent text, a plurality of images predicted as being relevant to the text, and one or more words predicted to follow the text input by the user: and
inserting, using a processor, a plurality of the images into the text sequentially in an order based on ranks of the predictions.

The computer implemented method described above comprising receiving user input selecting an automated image insertion function and inserting the images into the text after receiving the user input.

The computer implemented method described above comprising receiving user input and inserting the one or more images during the user input, and stopping inserting the one or more images when the user input ends.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computing device comprising:
a memory storing text input by a user;
a processor configured to send the text to a prediction engine having been trained to predict images from text;
the processor configured to receive from the prediction engine, in response to the sent text, a plurality of predictions, each prediction comprising an image predicted as being relevant to the text;
the processor configured to insert a plurality of images into the text based on criteria comprising ranks of the plurality of predictions; and
wherein the processor is configured to insert respective images of the plurality of images into the text sequentially including the image, one at a time via an automated process without user input after a first image of the plurality of images is inserted, in positions relative to the text corresponding to the criteria, the positions including a predetermined position for the image above or before the text, the predetermined position for the image being specified by the ranks associated with the plurality of predictions, wherein the ranks associated with the plurality of predictions are retrieved by the processor from memory.

2. The computing device of claim 1 wherein the processor is further configured to insert the plurality of images into the text in a manner responsive to a single user interaction before the insertion of the plurality of images.

3. The computing device of claim 2 wherein the processor is configured to control a speed of the insertion of the plurality of images into the text according to a duration of the single user interaction.

4. The computing device of claim 1 wherein the processor is configured to insert the plurality of images into the text in an order based on categories of the plurality of images.

5. The computing device of claim 1 wherein the criteria further comprise user input selecting an automated image insertion function.

6. The computing device of claim 5 wherein the processor is configured to insert the plurality of images only concurrently with the user input.

7. The computing device of claim 1 wherein the criteria comprise detection of a trigger word as part of the text.

8. The computing device of claim 1 wherein the predictions comprise at least one pair of co-occurring images, the prediction engine having been trained to predict pairs of co-occurring images.

9. The computing device of claim 1 wherein the criteria comprise one or more rules associated with an image, the processor being configured to access one or more rules from a memory for at least one of the predictions, and to insert the at least one predicted image into the text at a location selected using the one or more rules.

10. The computing device of claim 1 wherein the processor is configured to provide feedback to the user when insertion of the plurality of images is going to commence.

11. The computing device of claim 1 wherein the processor is configured to provide feedback to the user about progress of the insertion of the plurality of images.

12. The computing device of claim 1 wherein the predictions additionally comprise predicted words or predicted phrases, and wherein the processor is configured to offer for input predicted images associated with the predicted words or predicted phrases.

13. The computing device of claim 1 wherein the prediction engine is integral with the computing device.

14. A computing device comprising:
means for storing text input by a user;
means for sending the text to a prediction engine having been trained to predict images from text;
means for receiving from the prediction engine, in response to the sent text, a plurality of predictions, each prediction comprising an image predicted as being relevant to the text; and
means for inserting respective images of the plurality of predictions into the text sequentially in an order based on criteria comprising ranks associated with the plurality of predictions, and wherein the plurality of images are inserted into the text, one at a time via an automated process without user input after a first image of the respective images is inserted, in positions relative to the text corresponding to the criteria, the criteria comprising ranks of the predictions,
the positions including a predetermined position for the one or more of the plurality of images above or before the text, the predetermined position for the one or more of the plurality of images being specified by the ranks associated with the plurality of predictions, wherein the ranks associated with the plurality of predictions are retrieved by from memory.

15. A computer-implemented method comprising:
storing, at a memory, text input by a user;
sending the text to a prediction engine having been trained to predict words and images from text;
receiving from the prediction engine, in response to the sent text, a plurality of images predicted as being relevant to the text, and one or more words predicted to follow the text input by the user; and
inserting, using a processor, respective images of the plurality of images into the text sequentially based on criteria comprising ranks associated with the plurality of images predicted as being relevant to the text and the one or more words predicted to follow the text input, and
wherein the plurality of images are inserted into the text one at a time via an automated process without user input after a first image of the plurality of images is inserted, in positions relative to the text corresponding to the criteria, wherein the criteria comprises the ranks, the positions including a predetermined position for the image above or before the text, the predetermined position for the image being specified by the ranks associated with the plurality of images, wherein the ranks are retrieved by the processor from memory.

16. The computer implemented method of claim 15 wherein inserting the plurality of images into the text further comprises inserting the plurality of images in a manner responsive to a single user interaction.

17. The computer implemented method of claim 15 further comprising receiving user input selecting an automated image insertion function and inserting the plurality of images into the text after receiving the user input.

18. The computer implemented method of claim 15 further comprising receiving user input and inserting the plurality of images during the user input, and stopping inserting the plurality of images when the user input ends.

* * * * *